US012315322B2

(12) United States Patent
Zheng et al.

(10) Patent No.: US 12,315,322 B2
(45) Date of Patent: May 27, 2025

(54) SHEET MEDIUM STACKING AND SEPARTING APPARTUS; AND CASH RECYCLING AND HANDLING APPARATUS

(71) Applicant: Shandong New Beiyang Information Technology Co., Ltd., Shandong (CN)

(72) Inventors: Lei Zheng, Shangong (CN); Jiansheng Liu, Shandong (CN); Jianyu Sun, Shandong (CN); Qiangzi Cong, Shandong (CN)

(73) Assignee: Shandong New Beiyang Information Technology Co., Ltd., Shandong (CN)

( * ) Notice: Subject to any disclaimer, the term of this patent is extended or adjusted under 35 U.S.C. 154(b) by 0 days.

(21) Appl. No.: 17/788,704

(22) PCT Filed: Dec. 25, 2020

(86) PCT No.: PCT/CN2020/139585

§ 371 (c)(1),
(2) Date: Jun. 23, 2022

(87) PCT Pub. No.: WO2021/136104

PCT Pub. Date: Jul. 8, 2021

(65) Prior Publication Data

US 2024/0420535 A1 Dec. 19, 2024

(51) Int. Cl.
*G07D 11/14* (2019.01)
*G07D 11/16* (2019.01)

(52) U.S. Cl.
CPC ............ *G07D 11/14* (2019.01); *G07D 11/16* (2019.01)

(58) Field of Classification Search
CPC ...... G07D 11/14; G07D 11/16; B65H 3/5276; B65H 3/5284; B65H 3/5246
See application file for complete search history.

(56) References Cited

U.S. PATENT DOCUMENTS 9,540,194 B2 * 1/2017 Deng .................. B65H 3/0653
9,950,884 B2 * 4/2018 Kuriki ................. B65H 3/5284

FOREIGN PATENT DOCUMENTS

CN 101228561 A 7/2008
CN 203142033 U 8/2013
(Continued)

OTHER PUBLICATIONS

International Search Report issued in International Application No. PCTCN2020/139585, dated Feb. 26, 2021.
(Continued)

*Primary Examiner* — Howard J Sanders
(74) *Attorney, Agent, or Firm* — Mark H. Whittenberger; Holland & Knight LLP

(57) ABSTRACT

A sheet medium stacking and separating apparatus includes a frame, a supporting plate and a paper shifting mechanism. The frame is provided with a storage cavity. A first end of the storage cavity along a stacking direction of the sheet medium is provided with a paper inlet, and a second end of the storage cavity along the stacking direction of the sheet medium is provided with a paper outlet and a separation mechanism. The supporting plate can move along the stacking direction of the sheet medium, and has an output position and a receiving position. The paper shifting mechanism is disposed adjacent to the paper outlet, and the paper shifting mechanism is configured to drive the sheet medium to move into the storage cavity and away from the paper outlet.

20 Claims, 10 Drawing Sheets

(56) References Cited

FOREIGN PATENT DOCUMENTS

| | | | |
|---|---|---|---|
| CN | 203982483 | U | 12/2014 |
| CN | 105565061 | A | 5/2016 |
| CN | 108734853 | A | 11/2018 |
| CN | 208126485 | U | 11/2018 |
| CN | 208126487 | U | 11/2018 |
| CN | 208384678 | U | 1/2019 |
| CN | 208888923 | U | 5/2019 |
| CN | 209248626 | U | 8/2019 |
| CN | 110288764 | A | 9/2019 |
| CN | 111145426 | A | 5/2020 |
| JP | 2009251941 | A | 10/2009 |
| KR | 20120033233 | A | 4/2012 |

OTHER PUBLICATIONS

First Office Action issued in Chinese Patent Application No. 202010008149.X (Machine Translation) (2020).

First Search Report issued in Chinese Patent Application No. 202010008149.X (2020).

Supplemental Search Report issued in Chinese Patent Application No. 202010008149.X (2020).

* cited by examiner

SHEET MEDIUM STACKING AND SEPARTING APPARTUS; AND CASH RECYCLING AND HANDLING APPARATUS

RELATED APPLICATIONS

The subject application is a U.S. National Stage application of International Application No. PCT/CN2020/139585, filed on 25 Dec. 2020, which claims the benefit of Chinese Patent Application No. 202010008149.X, filed on 2 Jan. 2020. The contents of each application incorporated herein by reference.

The present disclosure claims priority to Chinese Patent Application No. 202010008149.X filed with the China National Intellectual Property Administration (CNIPA) on Jan. 2, 2020, the disclosure of which is incorporated herein by reference in its entirety.

TECHNICAL FIELD

The present disclosure relates to the field of self-service equipment, for example, to a sheet medium stacking and separating apparatus and a cash recycling and handling apparatus.

BACKGROUND

Cash recycling and handling apparatus is a kind of financial self-service apparatus which combines the functions of cash recycling, depositing, withdrawing, temporary storage, sorting, counting, counterfeit money identifying, end-of-day cash custody, inquiry and so on. With the cash recycling and handling apparatus, recycling of various denominations of domestic banknotes circulating can also be achieved. The cash recycling and handling apparatus is widely used in banking and other financial fields, which greatly facilitates users to handle related businesses.

The sheet medium stacking and separating apparatus in the existing technologies is susceptible to edgefold or breakage of the banknotes during the switchover process of outputting the banknote and inputting the banknote.

SUMMARY

The present application provides a sheet medium stacking and separating apparatus and a cash recycling and handling apparatus, which can solve a technical problem that a stacking and separating apparatus provided in the existing technologies easily causes edgefold or breakage of the banknotes.

Embodiments of the present disclosure provide a sheet medium stacking and separating apparatus, including a frame, a supporting plate and a paper shifting mechanism.

The frame is provided with a storage cavity used for accommodating a sheet medium. A first end of the storage cavity along a stacking direction of the sheet medium is provided with a paper inlet, a second end of the storage cavity along the stacking direction of the sheet medium is provided with a paper outlet and a separation mechanism. The separation mechanism includes a separating roller, a gate roller and a pickup roller, the pickup roller is disposed in the storage cavity, and the separating roller and the gate roller are disposed opposite to each other at the paper outlet.

The supporting plate is provided with a notch, is disposed in the storage cavity, is used for supporting the sheet medium, and is able to move along the stacking direction of the sheet medium, and has an output position and a receiving position; when the supporting plate is located at the receiving position, a space for accommodating the sheet medium is formed between the supporting plate and the paper inlet; and when the supporting plate moves to the output position, the pickup roller protrudes from a surface of the supporting plate through the notch so as to be able to contact with the sheet medium on the supporting plate. The paper shifting mechanism is disposed adjacent to the paper outlet, and the paper shifting mechanism is configured to drive the sheet medium to move into the storage cavity and away from the paper outlet.

Embodiments of the present application further provide a cash recycling and handling apparatus, including the sheet medium stacking and separating apparatus described above.

BRIEF DESCRIPTION OF DRAWINGS

The drawings used in description of the specific embodiments or the existing technologies will be briefly described below. Apparently, the drawings described below illustrate part of embodiments of the present application, and those of ordinary skill in the art may obtain other drawings based on these drawings on the premise that no creative work is done.

REFERENCE LIST

Figure 1:
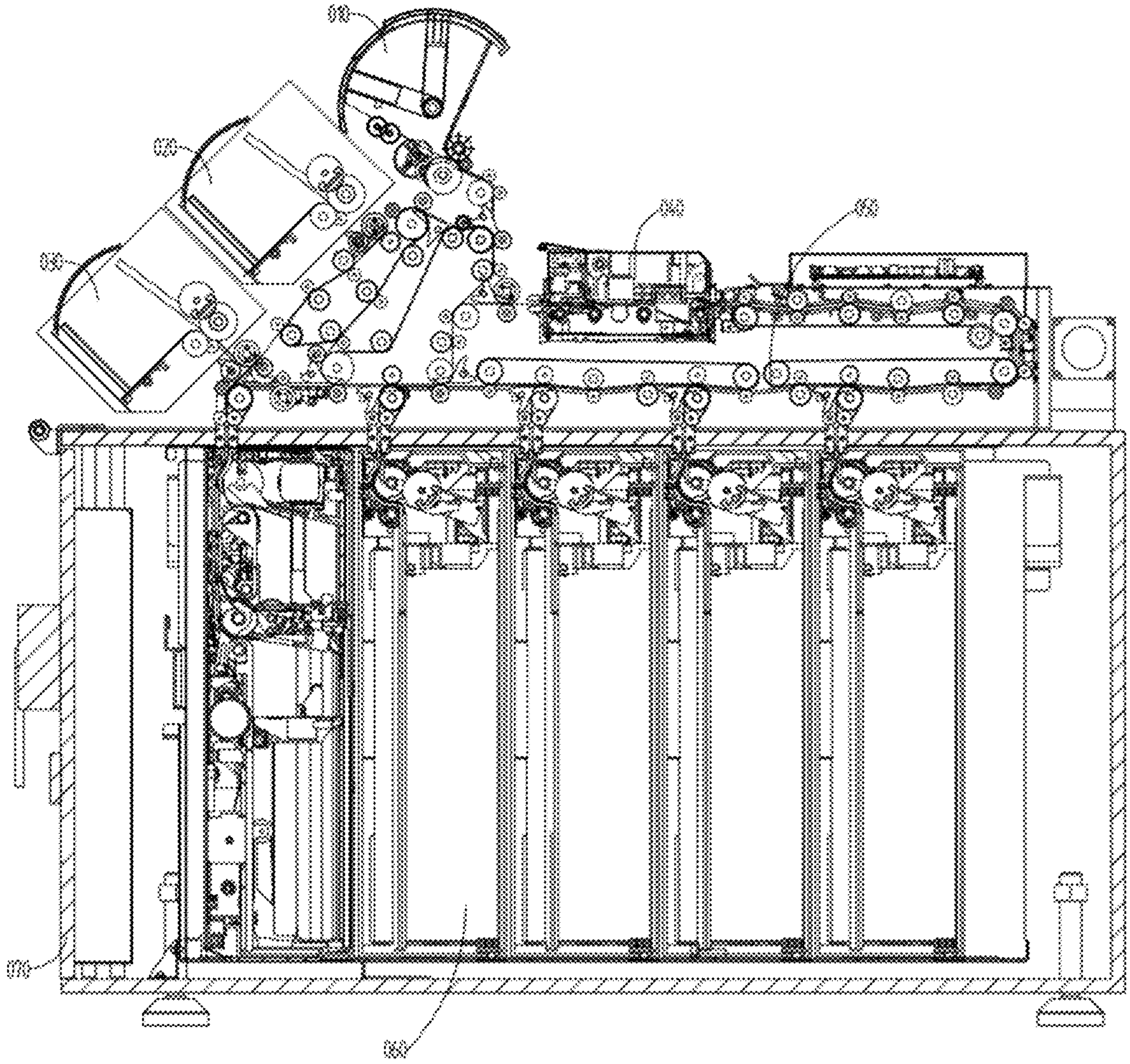
FIG. 1 is a structural cross-sectional view of a cash recycling and handling apparatus according to an embodiment of the present application.

010 cash input mechanism
020 cash output mechanism
030 temporary storage mechanism

040 identification mechanism
050 public passage
060 cash box
070 safe
100 frame
110 transport passage
120 support plate
111 first passage plate
112 second passage plate
210 first supporting plate
220 first storage cavity
230 first door
240 first guide plate
25 drive member
250 first motor
260 first inlet and outlet
270 paper inlet
280 first diverter
310 second supporting plate
320 second storage cavity
330 second door
340 second guide plate
350 second motor
360 second inlet and outlet
370 paper outlet
380 second diverter
40 separation mechanism
410 first gate roller
420 second gate roller
430 pickup roller
440 separating roller
450 feeding roller
500 paper shifting mechanism
50 transmission component
51 one-way lock component
53 driving member
54 driven member
510 spindle
520 paper shifting member
530 first sleeve
540 second sleeve
550 first elastic member
560 third sleeve
570 lock plate
580 support shaft
590 second elastic member
511 rolling bearing
512 pin
531 first end surface
532 first protrusion
533 top surface
534 side surface
535 slot
541 second end surface
542 second protrusion
543 stop surface
544 guide surface
561 insert part
562 stopper groove
571 lock portion
572 stopper portion
600 arrow of a first direction
700 arrow of a second direction

DETAILED DESCRIPTION

The technical solutions of the present application will be described clearly and completely in conjunction with examples. Apparently, the examples described are part, not all, of the examples of the present application. Based on the embodiments of the present application, all other embodiments obtained by those of ordinary skill in the art without creative work are within the scope of the present application.

In the description of the present application, it is to be noted that orientations or position relations indicated by terms such as “up” and “down” are based on the drawings. These orientations or position relations are intended only to facilitate and simplify the description of the present application and not to indicate or imply that a device or element referred to must have such particular orientations or must be configured or operated in such particular orientations.

In the description of the present application, it is to be noted that unless otherwise expressly specified and limited, the term “connection” is to be construed in a broad sense, for example, may be construed as a fixed connection, a detachable connection, or an integral connection; a direct connection or a connection through an intermediate medium. For those of ordinary skill in the art, meanings of the preceding terms can be understood according to situations in the present application.

In the existing technologies, a cash recycling and handling apparatus includes an inlet and outlet, an identification mechanism, a temporary storage mechanism, a cash box and a public passage connected between various mechanisms. Since the inlet and outlet, the cash box and the temporary storage mechanism each have the functions of cash inlet and outlet, the inlet and outlet, the cash box and the temporary storage mechanism each are provided with a sheet medium stacking and separating apparatus. The sheet medium stacking and separating apparatus may be provided with a cash storage cavity; a first end of the storage cavity along a stacking direction of the sheet medium is provided with an inlet, a second end of the storage cavity along the stacking direction of the sheet medium is provided with an outlet and a separation mechanism; the separation mechanism includes a separating roller, a gate roller and a pickup roller. The pickup roller is disposed in the storage cavity, and the separating roller and the gate roller are disposed opposite to each other at the outlet. The sheet medium stacking and separating apparatus further includes a supporting plate located in the storage cavity, the supporting plate can move along the stacking direction of the sheet medium and has an outlet position and a receiving position, and the supporting plate is provided with a notch. When the supporting plate is located at the receiving position, an accommodation space for cashes is formed between the supporting plate and the inlet, and cashes entering from the inlet are stacked on the supporting plate. When the supporting plate moves to the outlet position, the pickup roller contacts with the cashes supported on the supporting plate through the notch, so that the pickup roller can drive the cashes to move to the outlet, and the cashes are output from the outlet one by one by the separating roller and the gate roller.

When the sheet medium stacking and separating apparatus provided by the existing technologies completes cash output, under the action of the pickup roller, the cashes close to the pickup roller on the supporting plate are easy to shift to the outlet, so that along the stacking direction of sheet medium, the edges of the part of the cashes are located between the paper shifting roller and the gate roller. At this time, once the supporting plate moves to the receiving position, the supporting plate will drive the shifted cashes to move to the inlet, so that the part of the cashes collides with an inner wall of the storage cavity, thus causing the part of the cashes to be folded or damaged.

FIG. 1 is a structural cross-sectional view of a cash recycling and handling apparatus according to an embodiment of the present application. As shown in FIG. 1, the cash recycling and handling apparatus is provided in the embodiment of the present application and includes a cash input mechanism 010, a cash output mechanism 020, a temporary storage mechanism 030, an identification mechanism 040, a public passage 050 and a safe 070, where the safe 070 is provided with a plurality of cash boxes 060.

The basic working process of the cash recycling and handling apparatus is as follows: when the cashes are entered, the cashes are entered through the cash input mechanism 010, and after the cash are identified by the identification mechanism 040, the qualified cashes are transported to the temporary storage mechanism 030 for temporary storage; then, when the deposit is confirmed, the qualified cashes are stored in the cash box 060 of the safe 070 after passing through the public passage 050 and the identification mechanism 040, and the unqualified cashes are returned to the cash output mechanism 020 to be taken away by the user; and when the cashes are output, the cashes enter the public passage 050 from the cash box 060, and are transported to the identification mechanism 040 for identification through the public passage 050, cashes satisfying the requirements are output by the cash output mechanism 020 and is to be taken away by the user, and cashes that do not satisfy the requirements are returned to a cash box 060 for stacking the cashes of the plurality of cash boxes 060 for storage.

It is be noted that part of the structure and working process of the cash recycling and handling apparatus are existing technologies, which will not be described in detail.

In the cash recycling and handling apparatus provided in this embodiment, the cash input mechanism 010, the cash output mechanism 020, the cash box and the temporary storage mechanism 030 are all provided with the sheet medium stacking and separating apparatus. In the following text, the structure and operation process of the sheet medium stacking and separating apparatus will be described in detail by taking the sheet medium stacking and separating apparatus in the cash box 060 as an example.

Figure 2:
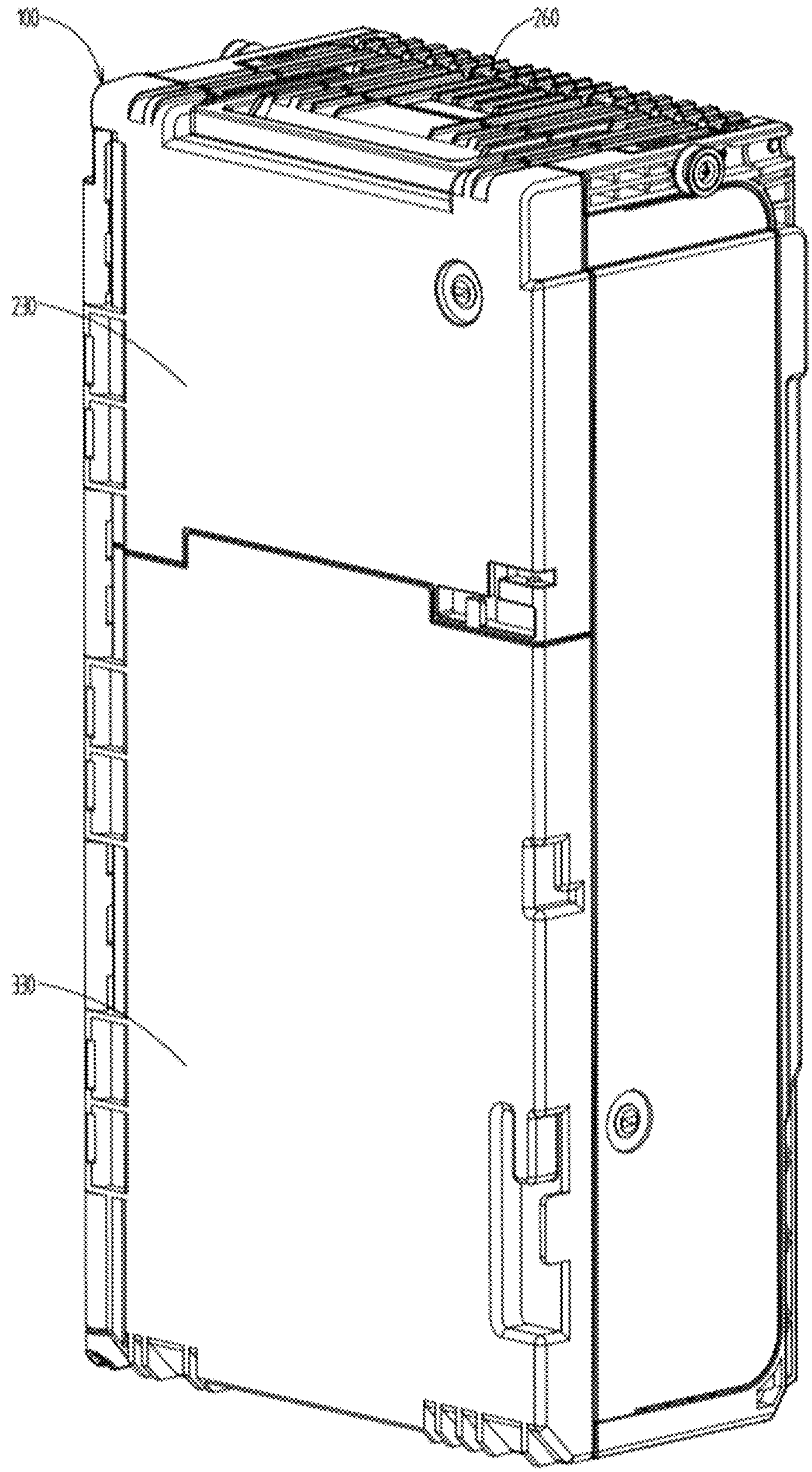
FIG. 2 is a structural view of a cash box of a cash recycling and handling apparatus according to an embodiment of the present application.
Figure 3:
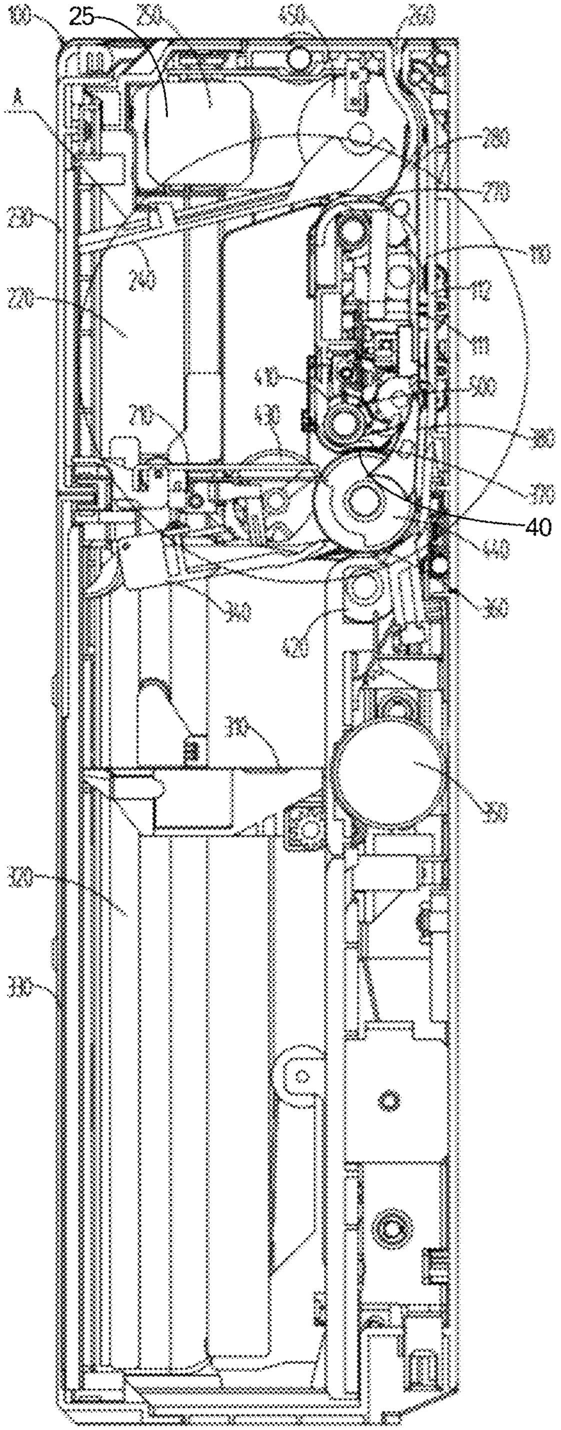
FIG. 3 is a structural cross-sectional view of a cash box of a cash recycling and handling apparatus according to an embodiment of the present application.
Figure 4:
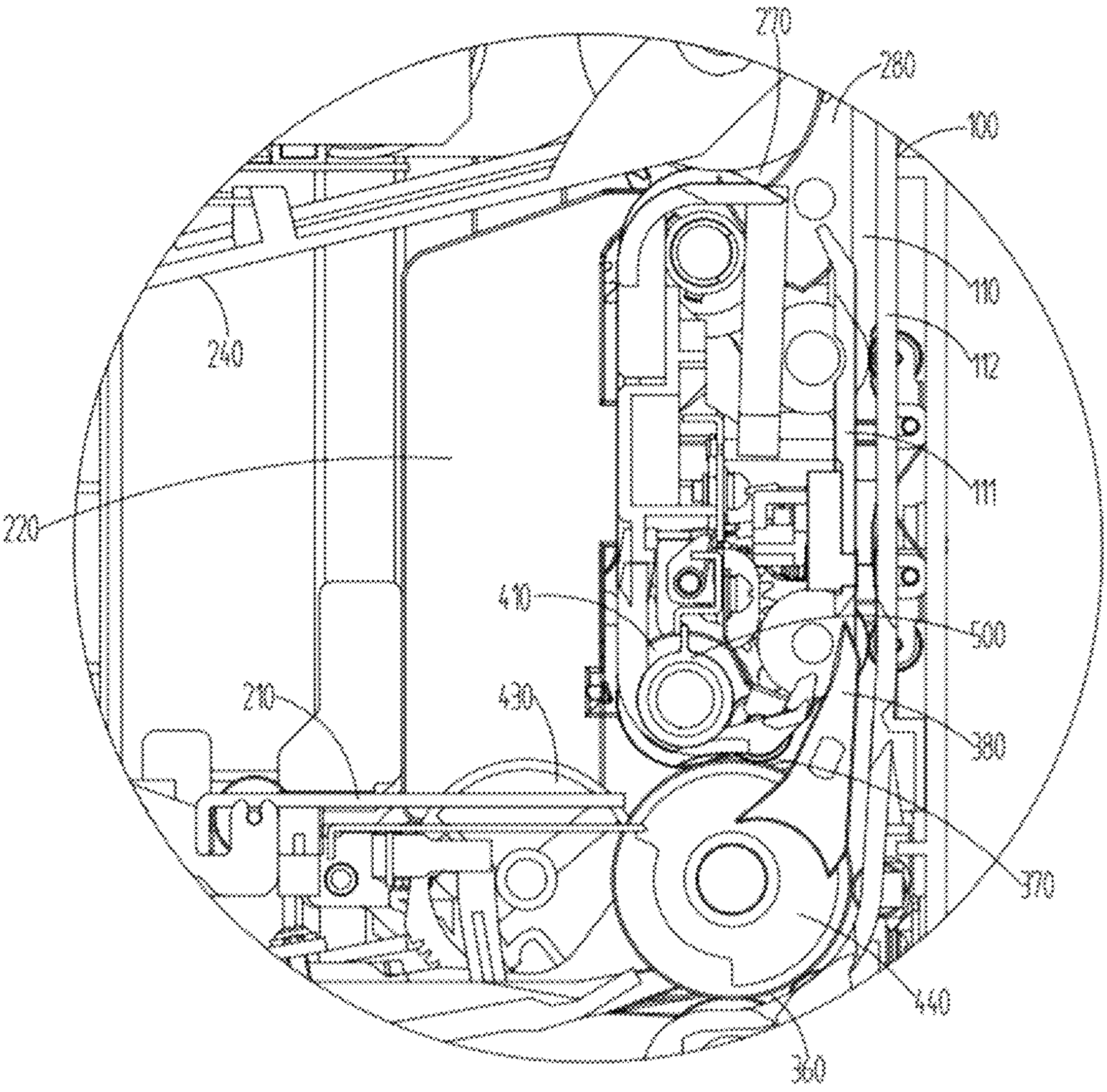
FIG. 4 is a partial enlarged view of part A of FIG. 3.

FIG. 2 is a structural view of a cash box of a cash recycling and handling apparatus according to an embodiment of the present application; FIG. 3 is a structural cross-sectional view of a cash box of a cash recycling and handling apparatus according to an embodiment of the present application; and FIG. 4 is a partial enlarged view of part A of FIG. 3. As shown in FIGS. 2 to 4, the sheet medium stacking and separating apparatus is provided in the cash box 060, and the sheet medium stacking and separating apparatus includes a frame 100, a supporting plate (such as a first supporting plate 210) and a paper shifting mechanism 500. In one embodiment, the frame 100 is provided with a storage cavity (such as a first storage cavity 220) used for accommodating a sheet medium (i.e., cashes). A first end of the first storage cavity 210 along a stacking direction of the sheet medium is provided with a paper inlet 270, a second end of the first storage cavity 210 along the stacking direction of the sheet medium is provided with a paper outlet 370 and a separation mechanism 40, the separation mechanism 40 includes a separating roller 440, a gate roller (such as a first gate roller 410) and a pickup roller 430, the pickup roller 430 is disposed in the first storage cavity 220, and the separating roller 440 and the first gate roller 410 are disposed opposite to each other at the paper outlet 370. The first supporting plate 210 is provided with a notch, is disposed in the first storage cavity 220, is used for supporting the sheet medium and is able to move along the stacking direction of the sheet medium, and has an output position and a receiving position. The paper shifting mechanism 500 is disposed adjacent to the paper outlet 370, and the paper shifting mechanism 500 is configured to drive the cashes to move into the first storage cavity 220 and away from the paper outlet 370.

In one embodiment, the stacking direction of the sheet medium extends along an up-down direction, and the receiving position of the first supporting plate 210 is located above the output position of the first supporting plate 210. In one embodiment, the paper shifting mechanism 500 is disposed in the storage cavity (such as the first storage cavity 220) of the frame 100. In other embodiments, the paper shifting mechanism 500 may also be disposed on the frame 100 and outside the first storage cavity 220 as long as it can drive the cashes to move into the first storage cavity 220 and away from the paper outlet 370, and is not limited herein.

When the first supporting plate 210 is located at the receiving position of the first supporting plate 210, an accommodation space for accommodating cashes is formed between the first supporting plate 210 and the paper inlet 270, and cashes enter from the paper inlet 270 are stacked on the first supporting plate 210. When the first supporting plate 210 moves to the paper outlet position, the pickup roller 430 protrudes from the surface of the first supporting plate 210 through the notch so as to contact with the cashes supported on the first supporting plate 210, so that the cashes are output from the first storage cavity 220 one by one through the paper outlet 370 under jointly action of the pickup roller 430, the separating roller 440 and the gate roller 410. When the first supporting plate 210 moves from the output position of the first supporting plate 210 to the receiving position of the first supporting plate 210 to continue to receive the cashes entering the first storage cavity 220, the paper shifting mechanism 500 operates to drive the cashes to move into the first storage cavity 220 and away from the paper outlet 370. With this arrangement, when the first supporting plate 210 moves to the receiving position of the first supporting plate 210, the cashes can be prevented from colliding with the inner wall of the first storage cavity 220, thereby preventing the cashes from being folded or damaged, enabling the cashes to be transported normally, thereby facilitating the normal use of the entire cash recycling and handling apparatus.

In one embodiment, the pickup roller 430, the separating roller 440 and the first gate roller 410 are rotatably connected to the frame 100, and the axes of the pickup roller 430, the separating roller 440 and the first gate roller 410 are all parallel to each other.

Referring to FIGS. 2 and 3, in this embodiment, the sheet medium stacking and separating apparatus may further include a second storage cavity 320, the first storage cavity 220 and the second storage cavity 320 are arranged along the stacking direction of the sheet medium, the second storage cavity 320 is provided with a second inlet and outlet 360, and a second supporting plate 310 is provided in the second storage cavity 320. The first supporting plate 210 is activity disposed in the first storage cavity 220 and can be moved in the first storage cavity 220 along the stacking direction of the sheet medium to switch between the receiving position of the first supporting plate 210 and the output position of the first supporting plate 210. The second supporting plate 310 is activity disposed in the second storage cavity 320 and can be moved in the second storage cavity 320 along the stacking direction of the sheet medium. Accordingly, the second supporting plate 310 has a receiving position and an output position, and can be switched between the receiving position of the second supporting plate 310 and the output position of the second supporting plate 310. The frame 100 further provided with a first inlet and outlet 260, and a transport passage 110 is provided in the frame 100, where the transport passage 110 is connected between the first inlet and outlet 260 and the first storage cavity 220 and the second storage cavity 320. The first supporting plate 210 is used for supporting a first type of cashes in the first storage cavity 220, the second supporting plate 310 is used for supporting a second type of cashes in the second storage cavity 320, and a feeding roller 450 is disposed close to the first inlet and outlet 260 for enabling the cashes to enter the transport passage 110 from the first inlet and outlet 260. In this embodiment, the cashes are stacked along the up-down direction, and the first storage cavity 220 and the second storage cavity 320 are arranged along the up-down direction. The transport passage 110 is formed by a first passage plate 111 and a second passage plate 112 disposed opposite and at intervals.

Figure 13:
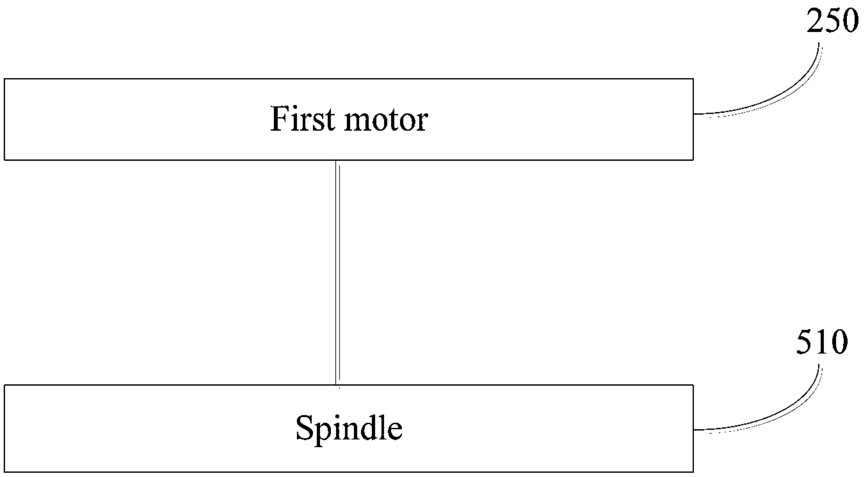
FIG. 13 is a view showing that a first motor and a spindle are connected.

Referring to FIGS. 3 and 13, the separation mechanism 40 is disposed between the first storage cavity 220 and the second storage cavity 320, the separation mechanism 40 further includes a second gate roller 420 and a first motor 250, where the first motor 250 is transmission-connected to the first gate roller 410, the second gate roller 420, the pickup roller 430 and the separating roller 440, which is used for driving the cashes in the first storage cavity 220 or the second storage cavity 320 to enter the transport passage 110 one by one. When the first supporting plate 210 is located at the receiving position of the first supporting plate 210, the first supporting plate 210 may receive cashes that enter the first storage cavity 220 from the paper inlet 270. When the first supporting plate 210 is located at the output position of the first supporting plate 210, the pickup roller 430 is in contact with the cashes on the first supporting plate 210 through the notch in the first supporting plate 210, the first motor 250 drives the pickup roller 430 to rotate to drive the cashes to move along a direction close to the separating roller 440, the separating roller 440 rotates, and the first gate roller 410 does not rotate or rotates in the reverse direction, so that the cashes can be driven into the transport passage 110 one by one from the paper outlet 370. When the second supporting plate 310 is located at the receiving position of the second supporting plate 310, the second supporting plate 310 may receive cashes that enter the second storage cavity 320 from the second inlet and outlet 360. When the second supporting plate 310 is located at the output position of the second supporting plate 310, the second supporting plate 310 presses the cashes on the second supporting plate 310 on the pickup roller 430, the first motor 250 drives the pickup roller 430 to rotate to drive the cashes to move in a direction close to the separating roller 440, the separating roller 440 rotates, and the second gate roller 420 does not rotate or rotates in the reverse direction, so that the cashes can be driven into the transport passage 110 one by one from the second inlet and outlet 360.

In one embodiment, the pickup roller 430, the separating roller 440, the first gate roller 410 and the second gate roller 420 are rotatably connected to the frame 100, and the axes of the pickup roller 430, the separating roller 440, the first gate roller 410 and the second gate roller 420 are all parallel to each other.

In one embodiment, the pickup roller 430, the separating roller 440 and the second gate roller 420 may jointly work to drive the sheet medium located in the second storage cavity 320 and below the pickup roller 430 into the paper outlet 370 through a gap between the separating roller 440 and the second gate roller 420.

It is to be noted that when the sheet medium stacking and separating apparatus has only one accommodation (e.g. has only the first storage cavity 220 and has no second storage cavity 320), the separation mechanism 40 includes only one gate roller, i.e. only the first gate roller 410.

Referring to FIG. 3, in this embodiment, the sheet medium stacking and separating apparatus further includes a first diverter 280 and a second diverter 380, and the first diverter 280 and the second diverter 380 are both disposed in the transport passage 110. The first diverter 280 is used for communicating the first inlet and outlet 260 with one of the paper outlet 370 and the second inlet and outlet 360 through the transport passage 110, and the second diverter 380 is used for communicating the transport passage 110 with the second inlet and outlet 360 or disconnecting the transport passage 110 from the second inlet and outlet 360. A first guide plate 240 is provided in the first storage cavity 220 for guiding the cashes entering the first storage cavity 220 from the paper inlet 270 to be stacked on the first supporting plate 210. A second guide plate 340 is provided in the second storage cavity 320 for guiding the cashes entering the second storage cavity 320 from the second inlet and outlet 360 to be stacked on the second supporting plate 310.

Referring to FIG. 3, the sheet medium stacking and separating apparatus further includes a second motor 350, and the second motor 350 is used for driving the first supporting plate 210 to move in the first storage cavity 220. In one embodiment, the second motor 350 may be transmission-connected to the first supporting plate 210 through a conveyor. The sheet medium stacking and separating apparatus further includes a first door 230 opposite to the first storage cavity 220 and a second door 330 opposite to the second storage cavity 320. A worker can take out the cashes located in the first storage cavity 220 and the second storage cavity 320, respectively by opening the first door 230 and the second door 330.

It is be noted that working process that two types of cashes are respectively stored and output by the cash sheet medium stacking and separating apparatus are existing technologies, which will not be described in detail.

Figure 5:
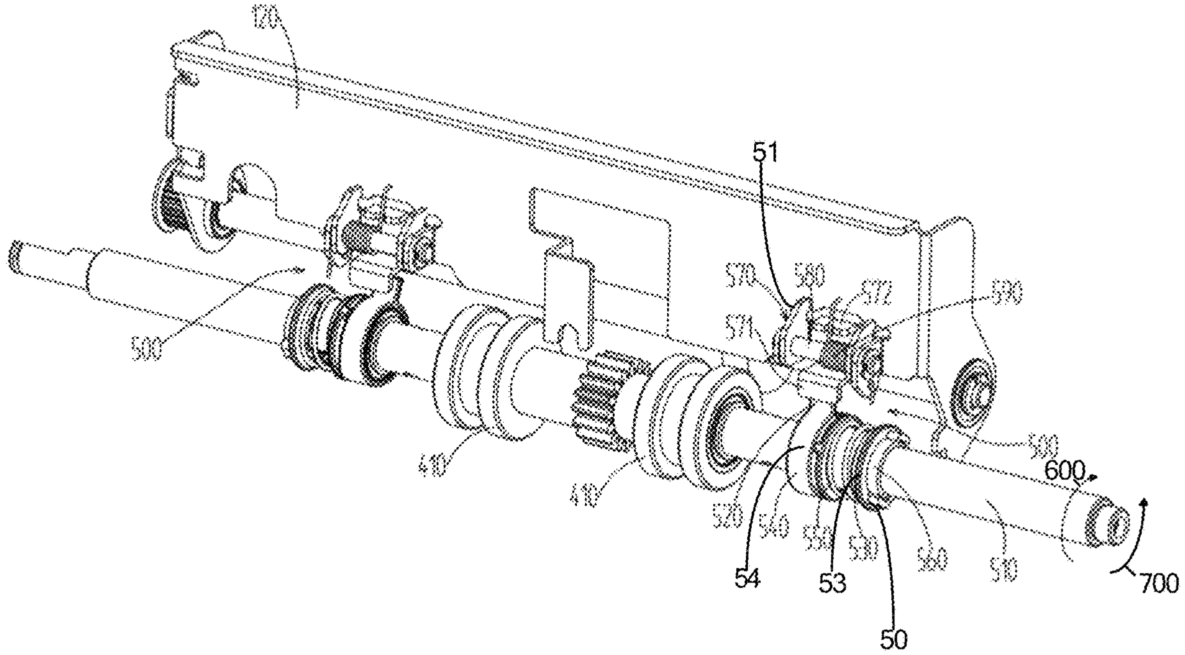
FIG. 5 is a partial structural view 1 of a sheet medium stacking and separating apparatus according to an embodiment of the present application.
Figure 6:
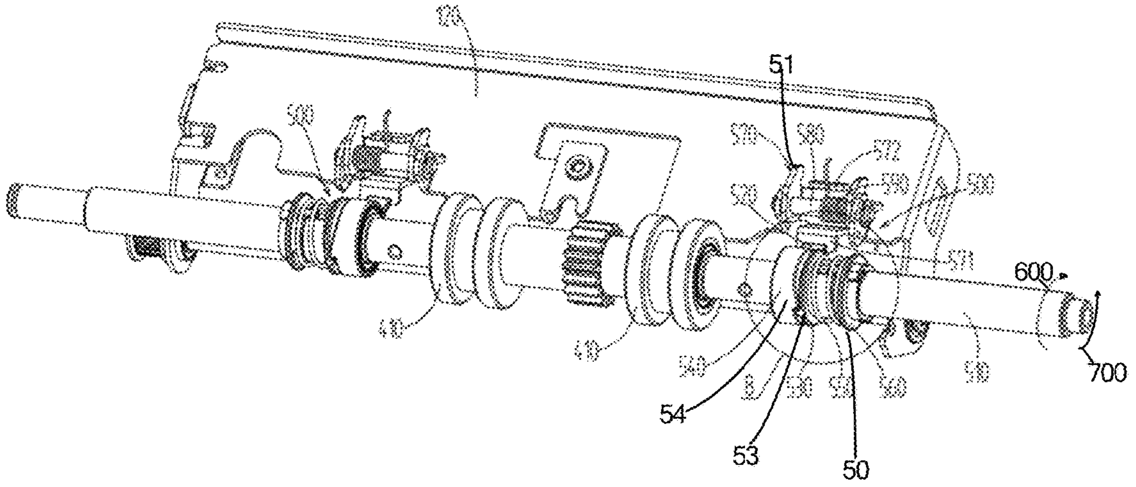
FIG. 6 is a partial structural view 2 of a sheet medium stacking and separating apparatus according to an embodiment of the present application.
Figure 7:
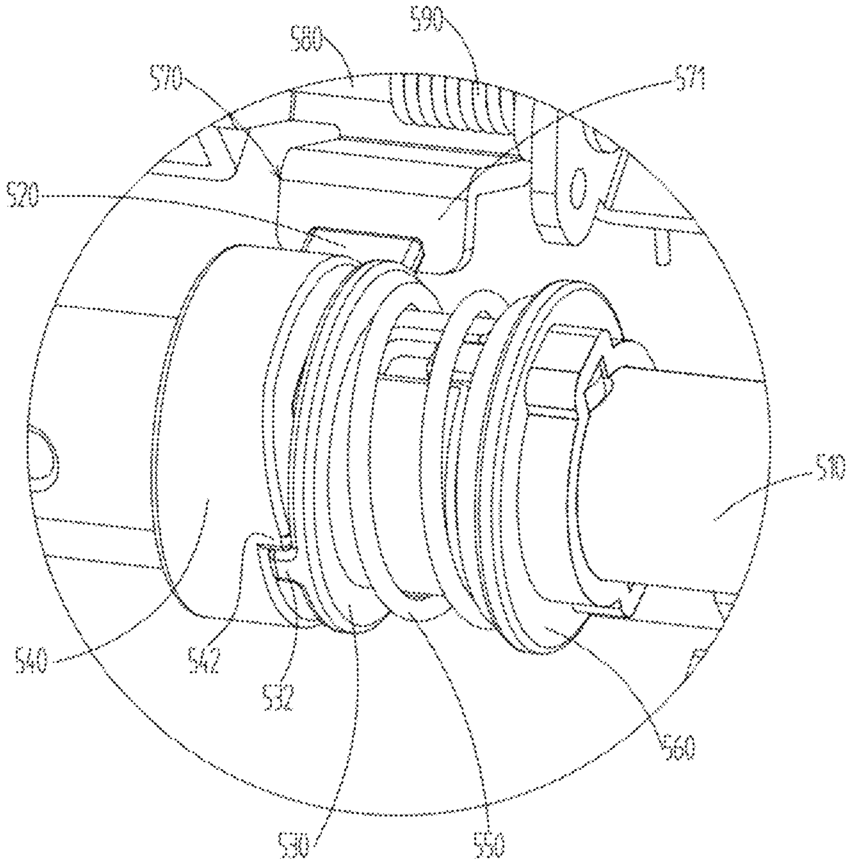
FIG. 7 is a partial enlarged view of part B of FIG. 6.

FIG. 5 is a partial structural view 1 of a sheet medium stacking and separating apparatus according to an embodiment of the present application, FIG. 6 is a partial structural view 2 of a sheet medium stacking and separating apparatus according to an embodiment of the present application and FIG. 7 is a partial enlarged view of part B of FIG. 6. With continued reference to FIG. 3 and FIG. 4 and in combination with FIG. 5 to FIG. 7, in this embodiment, the paper shifting mechanism 500 includes a drive member 25 and a paper shifting member 520, the drive member 25 is installed on the frame 100, the paper shifting member 520 is transmission-connected to the drive member 25, and the drive member 25 is configured to drive the paper shifting member 520 to move, so that the paper shifting member 520 can drive the cashes to move into the storage cavity and away from the paper outlet 370.

With this arrangement, when the first supporting plate 210 moves from the output position of the first supporting plate 210 to the receiving position of the first supporting plate 210, the drive member 25 operates to drive the paper shifting member 520 to move or rotate, so that the cashes moves into the first storage cavity 220 and away from the paper outlet 370, thereby avoiding the problem of edgefold or breakage of the cashes during the movement process of the first supporting plate 210 to the receiving position of the first supporting plate 210.

Optionally, in this embodiment, the drive member 25 drives the paper shifting member 520 to rotate so as to shift the cashes. In one embodiment, with continued reference to FIG. 3 to FIG. 7, the paper shifting mechanism 500 further a spindle 510, the spindle 510 is supported by the frame 100, an axis of the spindle 510 is parallel to an axis of the separating roller 440, the spindle 510 is transmission-connected to the drive member 25, and the spindle 510 can rotate around the axis of the spindle 510 under action of the drive member 25. The paper shifting member 520 is directly or indirectly connected to the spindle 510, and the paper shifting member 520 extends approximately along the radial direction of the spindle 510. When the drive member 25 drives the spindle 510 to rotate along a first direction, the spindle 510 drives the paper shifting member 520 to rotate along the first direction. When the paper shifting member 520 rotated along the first direction contacts with the cashes, the cashes can be driven to move into the first storage cavity 220 and away from the paper outlet 370. When the paper shifting member 520 is directly connected to the spindle 510, the paper shifting member 520 may be fixedly sleeved to the spindle 510, and the paper shifting member 520 may also be inserted into the spindle 510.

When the paper shifting member 520 is indirectly connected to the spindle 510, the paper shifting mechanism 500 further includes a transmission component 50, which is connected between the spindle 510 and the paper shifting member 520. When the drive member 25 drives the spindle 510 to rotate along the first direction, the spindle 510 drives the paper shifting member 520 to rotate along the first direction through the transmission component 50, so that the paper shifting member 520 drives the cashes in contact with the paper shifting member 520 to move into the first storage cavity 220 and away from the paper outlet 370.

In this embodiment, the transmission component 50 includes a driving member 53 and a driven member 54, where the driving member 53 is transmission-connected to the spindle 510, and the driven member 54 is connected to the paper shifting member 520. When the spindle 510 drives the driving member 53 to rotate along the first direction, the driven member 54 is transmission-connected to the driving member 53, and the driven member 54 drives the paper shifting member 520 to rotate along the first direction (the direction indicated by arrow 600*a* in FIGS. 5 and 6).

When the first supporting plate 210 moves from the output position of the first supporting plate 210 to the receiving position of the first supporting plate 210, the drive member 25 drives the spindle 510 supported on the frame 100 to rotate along the first direction, and the driving member 53 rotates accordingly, and transmits power to the driven member 54, and then the driven member 54 drives the paper shifting member 520 to rotate along the first direction, so that to drive the cashes move into the first storage cavity 220 and away from the paper outlet 370.

Optionally, as shown in FIGS. 5 and 6, the first gate roller 410 is sleeved on the spindle 510, and the separating roller 440 and the pickup roller 430 are both transmission-connected to the drive member 25, that is to say, the first gate roller 410, the separating roller 440 and the pickup roller 430 share one drive member 25 with the paper shifting member 520, that is, when the drive member 25 is the first motor 250, the power of the first gate roller 410, the power of the separating roller 440, the power of the pickup roller 430 and the power of the paper shifting member 520 are from the first motor 250. With this arrangement, not only the cost of the sheet medium stacking and separating apparatus of this embodiment is reduced, but also the structure of the sheet medium stacking and separating apparatus of this embodiment is also more compacted.

In other embodiments, the drive member 25 may be an electromagnet, and the electromagnet is transmission-connected to the paper shifting member 520. When an iron core of the electromagnet is extended or retracted, the paper shifting member 520 can be driven to move or rotate in the first storage cavity 220, thereby driving the cashes to move into the first storage cavity 220 and away from the paper outlet 370. For example, the paper shifting member 520 is fixedly connected to the iron core, and an extending direction of the paper shifting member 520 is perpendicular to a movement direction of the iron core. When the iron core of the electromagnet is extended or retracted, the paper shifting member 520 moves accordingly to be able to drive the cashes in contact with the paper shifting member 520 to move into the first storage cavity 220 and away from the paper outlet 370.

Figure 8:
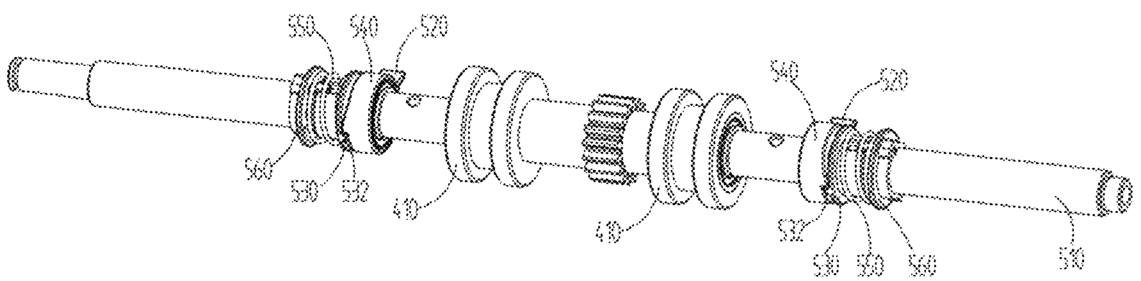
FIG. 8 is a partial structural view of a paper shifting mechanism of a sheet medium stacking and separating apparatus according to an embodiment of the present application.
Figure 9:
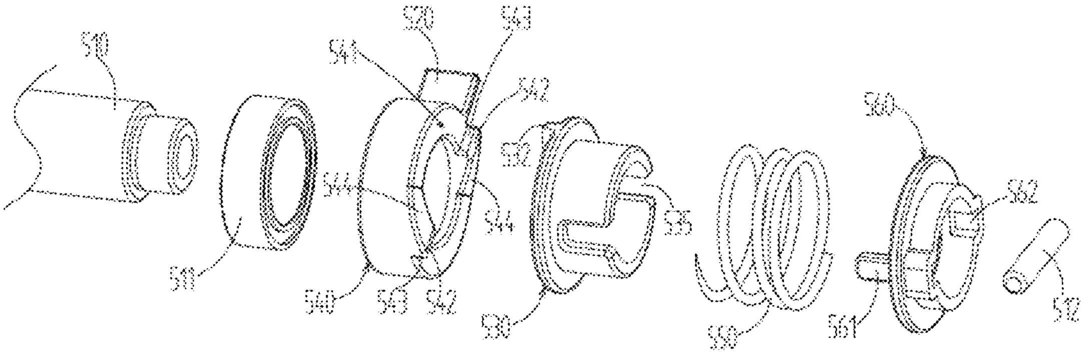
FIG. 9 is an exploded view 1 of a partial structure of a paper shifting mechanism of a sheet medium stacking and separating apparatus according to an embodiment of the present application.
Figure 10:
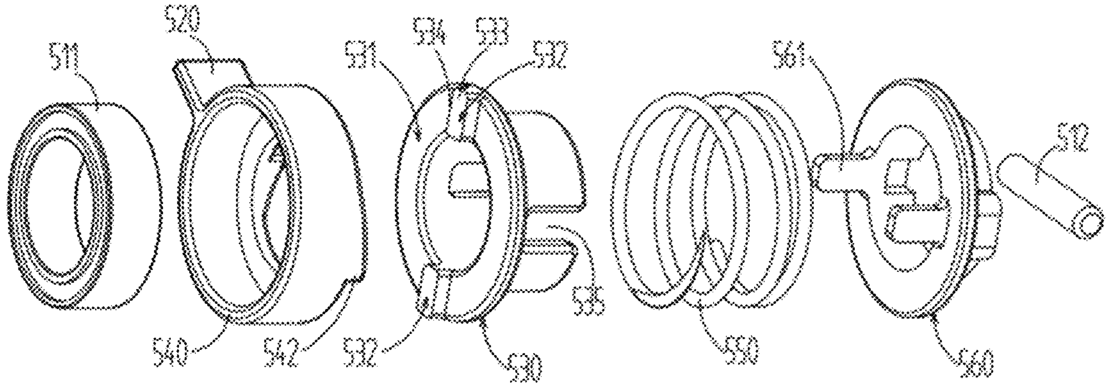
FIG. 10 is an exploded view 2 of a partial structure of a paper shifting mechanism of a sheet medium stacking and separating apparatus according to an embodiment of the present application.
Figure 11:
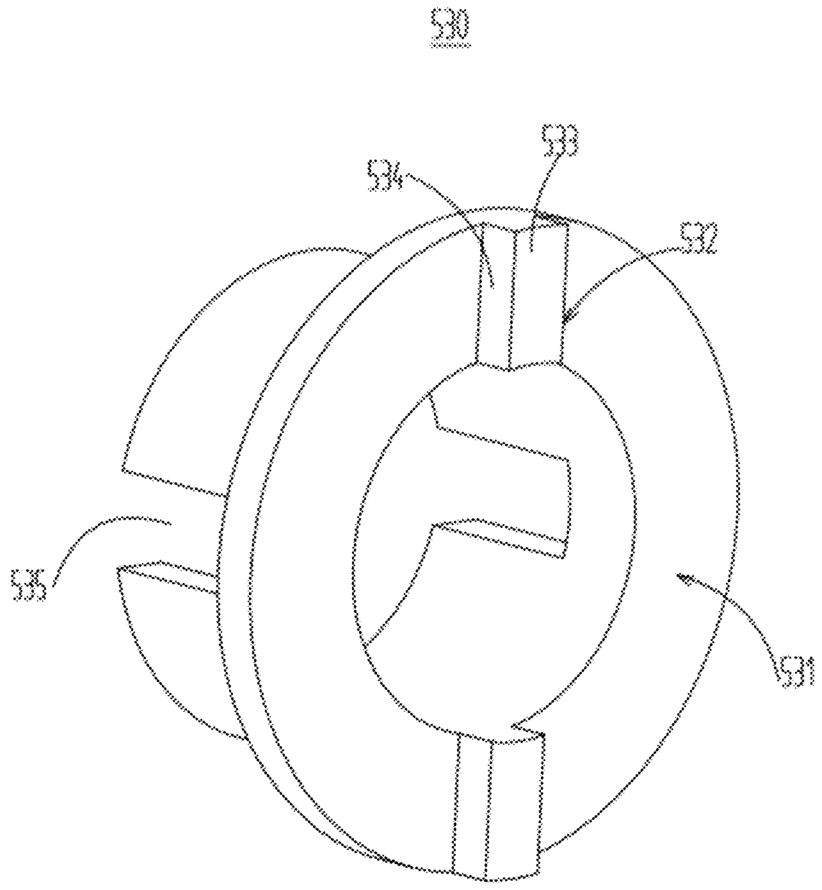
FIG. 11 is structural view of a first sleeve of a sheet medium stacking and separating apparatus according to an embodiment of the present application.
Figure 12:
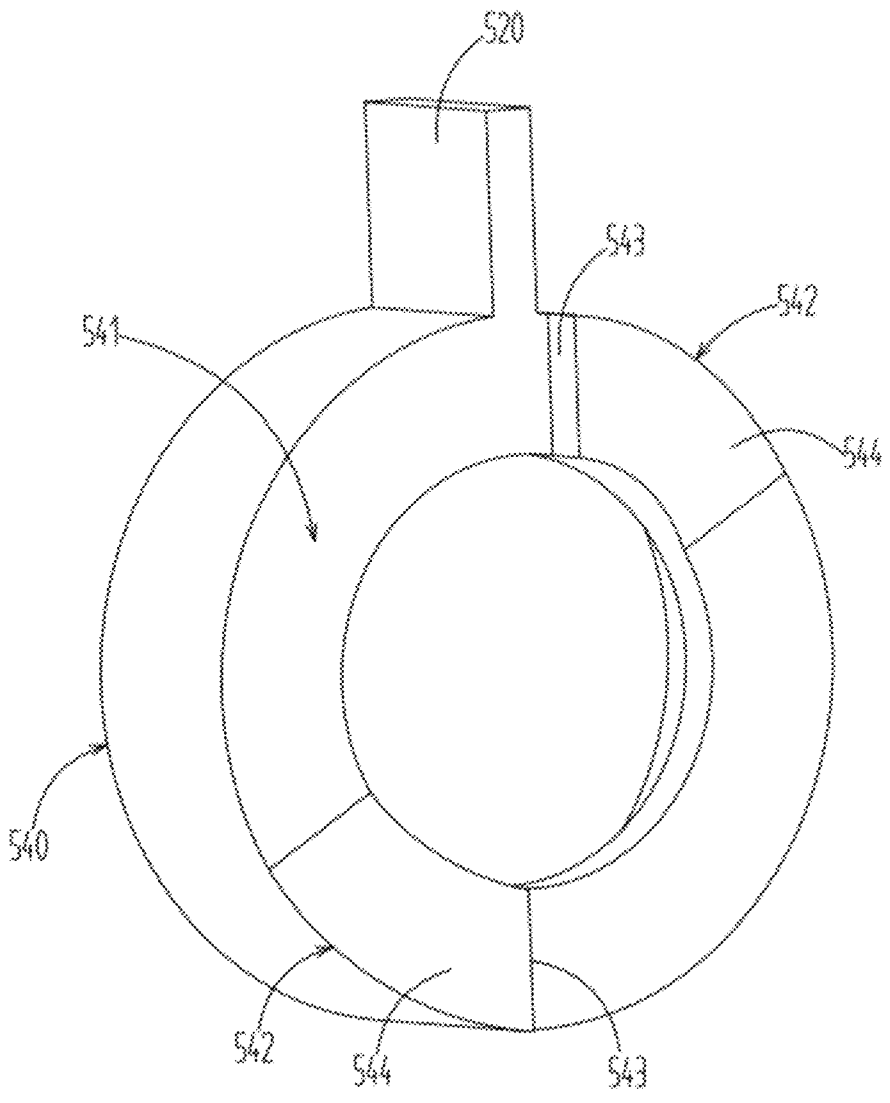
FIG. 12 is structural view of a second sleeve provided with a paper shifting member of a sheet medium stacking and separating apparatus according to an embodiment of the present application.

FIG. 8 is a partial structural view of a paper shifting mechanism of a sheet medium stacking and separating apparatus according to an embodiment of the present application, FIG. 9 is an exploded view 1 of a partial structure of a paper shifting mechanism of a sheet medium stacking and separating apparatus according to an embodiment of the present application, FIG. 10 is an exploded view 2 of a partial structure of a paper shifting mechanism of a sheet medium stacking and separating apparatus according to an embodiment of the present application, FIG. 11 is structural view of a first sleeve of a sheet medium stacking and separating apparatus according to an embodiment of the present application, and FIG. 12 is structural view of a second sleeve provided with a paper shifting member of a sheet medium stacking and separating apparatus according to an embodiment of the present application.

With continued reference to FIG. 5 to FIG. 7 and in combination with FIG. 8 to FIG. 12, the driving member 53 may include a first sleeve 530, where the first sleeve 530 is sleeved on the spindle 510, and the first sleeve 530 is able to rotate synchronously with the spindle 510 and move along an axial direction of the spindle 510. In one embodiment, the first sleeve 530 includes a first end surface 531 and a first protrusion 532 disposed on the first end surface 531, and the first end face 531 is perpendicular to the spindle 510. The first protrusion 531 includes a side surface 534 and a top surface 533, where the side surface 534 is connected to the first end surface 531, and the side surface 534 is arranged at a first included angle with the first end surface 531. In one embodiment, the first included angle between the side surface 534 and the first end surface 531 is 90 degrees. The top surface 533 is spaced from the first end surface 531, and the top surface 533 is arranged at a second included angle with the side surface 534. In one embodiment, the second included angle between the top surface 534 and the side surface 534 is 90 degrees, that is, the top surface 533 is parallel to the first end surface 531. This arrangement is easy to handle.

With continued reference to FIGS. 5 to 12, the driven member 54 may include a second sleeve 540, the second sleeve 540 is rotatably sleeved on the spindle 510, and the second sleeve 540 is fixed along the axial direction of the spindle 510. In one embodiment, the second sleeve 540 includes a second end surface 541 and a second protrusion 542 disposed on the second end surface 541, and the second end surface 541 is perpendicular to the spindle 510 and disposed opposite to the first end surface 531. The second protrusion 542 includes a stop surface 543 and a guide surface 544, where the stop surface 543 is used for fitting with the side surface 534 of the first protrusion 532, and the guide surface 544 is used for fitting with the top surface 533 of the first protrusion 532.

In one embodiment, the second end surface 541 is perpendicular to the stop face 543, the guild surface 544 is arranged at a third included angle with the second end surface 541, and the guild surface 544 is arranged at a fourth included angle with the stop surface 543.

The paper shifting member 520 is fixedly connected to the second sleeve 540 and extends along the radial direction of the second sleeve 540 (that is, in the radial direction of the spindle 510).

When the first supporting plate 210 moves from the output position of the first supporting plate 210 to the receiving position of the first supporting plate 210, an output shaft of the first motor 250 rotates forwardly to drive the spindle 510 to rotate along the first direction, so as to drive the first sleeve 530 sleeved on the spindle 510 to rotate synchronously. When the first sleeve 530 rotates until the side surface 534 abut against the stop surface 543 of the second sleeve 540, the first sleeve 530 drives the second sleeve 540 to rotate synchronously, thereby driving the paper shifting member 520 to rotate along the first direction, so that the paper shifting member 520 drives the cashes to move into the first storage cavity 220 and away from the paper outlet 370. When the output shaft of the first motor 250 rotates reversely, the spindle 510 is driven to rotate along a second direction (i.e. the opposite direction of the direction indicated by the arrow 600, namely arrow 700, in FIGS. 5 and 6), at this time, the side surface 534 of the first sleeve 530 is separated from the stop surface 543 of the second sleeve 540, and the top surface 533 of the first sleeve 530 is slidably fit with the guide surface 544 of the second sleeve 540 and the second end surface 541 of the second sleeve 540, the top surface 533 of the first sleeve 530 can slide along the guide surface 544 and the second end surface 541 of the second sleeve 540, so that the second sleeve 540 loses power and stops rotating, and the paper shifting member 520 stops rotating accordingly.

In this embodiment, the second sleeve 540 is sleeved on the spindle 510 through a rolling bearing 511. Optionally, the rolling bearing 511 is a deep groove ball bearing.

In other embodiments, the transmission component 50 includes a one-way bearing, and the one-way bearing includes an inner ring and an outer ring. In one embodiment, the inner ring of the one-way bearing is fixedly sleeved on the spindle 510, and the paper shifting member 520 is connected to the outer ring of the one-way bearing. That is, the inner ring of the one-way bearing is served as the driving member 53, and the outer ring of the one-way bearing is served as the driven member 54.

In other embodiments, the transmission component 50 includes a torque limiter, a first end of the torque limiter is fixedly connected to the spindle 510, and a second end of the torque limiter is transmission-connected to the paper shifting member 520, that is, the first end of the torque limiter is served as the driving member 53, and the second end of the torque limiter is served as the driven member 54.

With continued reference to FIGS. 5 to 10, in this embodiment, the transmission component 50 may further include a third sleeve 560 and a first elastic member 550. In one embodiment, the third sleeve 560 is fixedly sleeved on the spindle 510 and located on one side of the first sleeve 530 away from the second sleeve 540, the third sleeve 560 is inserted into the first sleeve 530 along the axial direction of the spindle 510, and the first sleeve 530 may be moved along the spindle 510, away from the third sleeve 560 while approaching the second sleeve 540, or away from the second sleeve 540 while approaching the third sleeve 560. The first elastic member 550 is connected between the first sleeve 530 and the third sleeve 560, and the first elastic member 550 is configured to cause the first sleeve 530 to have a motion tendency to approach the second sleeve 540. With this arrangement, when the spindle 510 rotates along the second direction, the top surface 533 of the first sleeve 530 can slide along the second end surface 541 to the guide surface 544 of the second sleeve 540, and slide along the guide surface 544, and then abut against the second end surface 541 after crossing the stop surface 543, that is, when the spindle 510 rotates along the second direction, the top surface 533 of the first sleeve 530 is in contact with the second end surface 541 and the guide surface 544 in turn, in contact with the second end surface 541 and the guide surface 544 in turn after crossing over the stop surface 543, and the cycle repeats itself. The first sleeve 530 can rotate relative to the second sleeve 540 without hindrance as long as the spindle 510 rotates along the second direction. Meanwhile, the first sleeve 530 is always abut against the second end face 541 or the guide face 544 of the second sleeve 540, thus avoiding the problem of noise caused by the axial movement of the first sleeve 530 when the first sleeve 530 rotates relative to the second sleeve 540.

With continued reference to FIGS. 9 and 10, in this embodiment, the paper shifting mechanism 500 further includes a pin 512, where the spindle 510 is provided with a through hole extending radially along the spindle 510, and the pin 512 is inserted into the through hole. At the same time, a stopper groove 562 is provided on one side of the third sleeve 560 away from the first sleeve 530, and two end of the pin 512 project from the spindle 510 and stuck into the stopper groove 562. With this arrangement, the third sleeve 560 is axially limited and the paper shifting mechanism 500 is easy to disassemble and maintain, thereby reducing the maintenance cost.

Apparently, a blocking portion may be provided on the spindle 510. For example, when the pin 512 is fixed in the through hole of the spindle 510, and a portion of the pin 512 projecting from the spindle 510 is connected to the first elastic member 550, at this time, the transmission component 50 only includes the first elastic member 550. In one embodiment, the first elastic member 550 is connected between the blocking portion and the first sleeve 530, and the first elastic member 550 is configured to cause the first sleeve 530 to have a motion tendency to approach the second sleeve 540. This arrangement also ensures that the top surface 533 of the first sleeve 530 can slide along the second end surface 541 to the guide surface 544 of the second sleeve 540 and slide along the guide surface 544 when the spindle 510 rotates along the second direction.

With continued reference to FIGS. 9 and 10, the first sleeve 530 is provided with a slot 535, a length direction of the slot 535 is parallel to the axis direction of the spindle 510, and accordingly, the third sleeve 560 is provided with an insert part 561, the insert part 561 is inserted into the slot 535, and the insert part 561 is movable relative to the slot 535 along the length direction of the slot 535. Optionally, the maximum sliding stroke of the first sleeve 530 between the second sleeve 540 and the third sleeve 560 is not greater than the length of the movement stroke of the insert part 561 within the slot 535.

Optionally, there are two slots 535, and the two slots 535 are arranged at an interval along a circumferential direction of the first sleeve 530, and correspondingly, the number of insert parts 561 on the third sleeve 560 is also two, and the two insert parts 561 is inserted into the two slots 535 in one-to-one correspondence.

With continued reference to FIGS. 5 to 7, the transmission component 50 further includes a one-way lock component 51, the one-way lock component 51 is configured to fit with the paper shifting member 520 or the driven member 54 when the spindle 510 rotates along the second direction, so as to prevent the paper shifting member 520 from rotating along the second direction.

With this arrangement, when the first motor 250 drives the pickup roller 430 and the separating roller 440 to rotate for cash discharge, the first motor 250 also drives the spindle 510 to rotate along the second direction. At this time, the paper shifting member 520 is blocked by the one-way lock component 51 and cannot continue to rotate along the second direction, thus avoiding the influence of the paper shifting member 520 on cash discharge.

With continued reference to FIGS. 5 to 7, in this embodiment, the one-way lock component 51 includes a lock plate 570 and a second elastic member 590, where the lock plate 570 is pivotally connected to the frame 100 through a support shaft 580, and the lock plate 570 has an unlock position that allows the paper shifting member 520 to rotate along the first direction, and a lock position that restricts the paper shifting member 520 to rotate along the second direction. In one embodiment, a first end of the lock plate 570 is provided with a lock portion 571, and a second end of the lock plate 570 is provided with a stopper portion 572. The support shaft 580 is located between the lock portion 571 and the stopper portion 572, and the lock portion 571 is located on a rotation route of the paper shifting member 520. When the lock plate 570 is located at the unlock position, the stopper portion 572 is separated from the frame 100, the lock portion 571 is able to be slidably fitted with and separated from the paper shifting member 520, and the lock portion 571 is withdrawn from the rotation route of the paper shifting member 520, so that the paper shifting member 520 is not prevented from continuing to rotate. When the lock plate 570 is located at the lock position, the stopper portion 572 abuts against the frame 100, that is the lock portion 571 is able to slide relative to the paper shifting member 520 rotating in the first direction, and as the paper shifting member 520 continues to rotate, the lock portion 571 is separated from the paper shifting member 520, and the lock portion 571 extends into the rotation route of the paper shifting member 520 and is able to prevent the paper shifting member 520 from rotating along the second direction. The second elastic member 590 is connected between the frame 100 and the lock plate 570, and the second elastic member 590 is configured to cause the lock plate 570 to have a tendency to move towards the lock position. In one embodiment, the frame 100 includes a support plate 120, and the lock plate 570 is rotationally connected to the support plate 120.

In the absence of other external forces, the lock plate 570 is located at the lock position under the action of the second elastic member 590, and the stopper portion 572 abuts against the support plate 120 of the frame 100. When the paper shifting member 520 is rotated along the first direction to drive the cashes to move into the first storage cavity 220 and away from the paper outlet 370, the paper shifting member 520 rotated along the first direction is in contact with a first side surface of the lock portion 571 of the lock plate 570, and the lock plate 570 is driven to rotate about the support shaft 580, so that the stopper portion 572 of the lock plate 570 is separated from the support plate 120. Meanwhile, the paper shifting member 520 rotated along the first direction can slide relative to the lock plate 571 and is gradually separated from the lock plate 571. When the lock plate 571 is withdrawn from the rotation route of the paper shifting member 520, the paper shifting member 520 can continue to rotate along the first direction to drive the cashes. When the cashes are discharged (that is, the cashes in the first storage cavity 220 is discharged from the paper outlet 370), the spindle 510 rotates along the second direction, and under the action of friction between the first sleeve 530 and the second sleeve 540, the paper shifting member 520 is driven to rotate along the second direction, at this time, under the action of the second elastic member 590, the stopper portion 572 of the lock plate 570 abuts against the support plate 120, the lock plate 570 is defined in the lock position by the support plate 120 of the frame 100, and the paper shifting member 520 rotated along the second direction abuts against the second side surface of the lock portion 571 of the lock plate 570. At this time, the stopper portion 572 abuts against the support plate 120 of the frame 100 so that the lock plate 570 cannot be rotated, Therefore, the lock portion 571 is always located on the rotational route of the paper shifting member 520, the paper shifting member 520 is blocked by the lock portion 571, and the resistance is greater than the friction between the first sleeve 530 and the second sleeve 540, so that the first sleeve 530 and the second sleeve 540 slip relatively, and the spindle 510 rotating along the second direction cannot continue to drive the paper shifting member 520 to rotate along the second direction, and the paper shifting member 520 stays at a position where the paper shifting member 520 abuts against the second side surface of the lock portion 571 of the lock plate 570. This arrangement not only avoids the phenomenon of edgefold or breakage of the cashes in the process of receiving cashes, but also avoids that the paper shifting member 520 blocks the cashes in the cash discharging process, thereby ensuring the smooth progress of the cash discharging process. Moreover, the paper shifting member 520 maintains in a position abutting against the lock plate 570 at the lock position, thus improving the stability of the paper shifting member 520 and the whole sheet medium stacking and separating apparatus in the cash discharging process.

With continued reference to FIGS. 5 to 7, in this embodiment, the lock plate 570 is pivoted to the support plate 120 through the support shaft 580, and the second elastic member 590 is a torsion spring sleeved on the support shaft 580.

With continued reference to FIG. 12, in this embodiment, the paper shifting member 520 is fixedly connected to an outer peripheral surface of the second sleeve 540. With this arrangement, there not only has a simple structure, but also ensures the reliability of the cashes being shifted.

Optionally, the paper shifting member 520 is in a plate shape, and one end of the paper shifting member 520 away from the second sleeve 540 extends along a radial direction of the second sleeve 540. With this arrangement, the contact area between the paper shifting member 520 and the lock portion 571 is effectively increased, thereby ensuring the reliability of the paper shifting member 520 being locked by the lock portion 571.

With continued reference to FIGS. 5 and 6, in this embodiment, the sheet medium stacking and separating apparatus includes two groups of paper shifting mechanisms 500, and the two groups of paper shifting mechanisms are arranged at an interval along the axial direction of the spindle 510. With this arrangement, the stress point of the cash in the cash shifting process is increased, so that the stress of the cash is balanced, the deflection of the cash is avoided, the cash can be stacked neatly on the first supporting plate 210, and the reliability of cash conveying is ensured. It is be noted that in this embodiment, the operation process of the sheet medium stacking and separating apparatus is described only by taking the sheet medium as a cash. Apparently, the sheet medium may also be a bill or the like. In this case, the sheet medium stacking and separating apparatus may be used in a bill processing device.

The sheet medium stacking and separating apparatus provided in this application includes the frame provided with the storage cavity, the supporting plate disposed in the storage cavity and the paper shifting mechanism configured to drive the sheet medium to move into the storage cavity and away from the paper outlet. The storage cavity is used for stacking the sheet medium, the first end of the storage cavity along a stacking direction of the sheet medium is provided with a paper inlet, and the second end of the storage cavity along a stacking direction of the sheet medium is provided with the paper outlet and the separation mechanism 40. The separation mechanism 40 includes the pickup roller disposed in the storage cavity, the separating roller and the gate roller both disposed opposite to each other at the paper outlet. The supporting plate is provided with the notch and is able to move along the stacking direction of the sheet medium and has the output position and the receiving position. The paper shifting mechanism is disposed adjacent to the paper outlet.

When the supporting plate is located at the receiving position, a space for accommodating the sheet medium is formed between the supporting plate and the paper inlet, and the sheet medium are entered from the paper inlet and be stacked on the supporting plate. When the supporting plate moves to the paper outlet position, the pickup roller protrudes from a surface of the supporting plate through the notch to contact with the sheet medium on the supporting plate, so that under the joint action of the pickup roller, the paper separating roller and the gate roller, the sheet medium are output from the paper outlet to the outside of the storage cavity one by one. When the supporting plate moves from the output position to the receiving position to continue to support the sheet medium entering the storage cavity, the paper shifting mechanism 500 operates to drive the sheet medium to move into the storage cavity and away from the paper outlet. With this arrangement, when the supporting plate moves to the receiving position in the existing technologies, the cashes can be prevented from colliding with the inner wall of the storage cavity, thereby preventing the cashes from being folded or damaged, enabling the cashes to be transported normally, thereby facilitating the normal use of the entire cash recycling and handling apparatus.

In this application, the above-mentioned sheet medium stacking and separating apparatus is arranged in the cash recycling and handling apparatus, and the cash recycling and handling apparatus accordingly has all the advantage of the above-mentioned sheet medium stacking and separating apparatus. The advantages are not repeated here.

What is claimed is:

1. A sheet medium stacking and separating apparatus, comprising:

a frame, wherein the frame is provided with a storage cavity used for accommodating a sheet medium, a first end of the storage cavity along a stacking direction of the sheet medium is provided with a paper inlet, a second end of the storage cavity along the stacking direction of the sheet medium is provided with a paper outlet and a separation mechanism, the separation mechanism comprises a separating roller, a gate roller and a pickup roller, the pickup roller is disposed in the storage cavity, and the separating roller and the gate roller are disposed opposite to each other at the paper outlet;

a supporting plate, wherein the supporting plate is provided with a notch, and is disposed in the storage cavity, the supporting plate is used for supporting the sheet medium, is able to move along the stacking direction of the sheet medium, and has an output position and a receiving position; when the supporting plate is located at the receiving position, a space for accommodating the sheet medium is formed between the supporting plate and the paper inlet; and when the supporting plate moves to the output position, the pickup roller protrudes from a surface of the supporting plate through the notch so as to be able to contact with the sheet medium located on the supporting plate; and a paper shifting mechanism, wherein the paper shifting mechanism is disposed adjacent to the paper outlet, and the paper shifting mechanism is configured to operate to drive the sheet medium to move into the storage cavity and away from the paper outlet when the supporting plate moves from the output position to the receiving position to continue to receive the sheet medium entering the first storage cavity.

2. The sheet medium stacking and separating apparatus of claim 1, wherein the paper shifting mechanism comprises a drive member and a paper shifting member, the drive member is installed on the frame, the paper shifting member is transmission-connected to the drive member, and the drive member is configured to drive the paper shifting member to move so as to drive the sheet medium to move into the storage cavity and away from the paper outlet.

3. The sheet medium stacking and separating apparatus of claim 2, wherein the paper shifting mechanism further comprises a spindle and a transmission component, the spindle is supported by the frame, an axis of the spindle is parallel to an axis of the separating roller, the spindle is transmission-connected to the drive member, and the spindle is able to rotate around the axis of the spindle under action of the drive member; and the transmission component comprises a driving member and a driven member, the driving member is transmission-connected to the spindle, and the driven part is connected to the paper shifting member; and when the spindle drives the driving member to rotate along a first direction, the driven member is transmission-connected to the driving member, and the driven member drives the paper shifting member to rotate along the first direction.

4. The sheet medium stacking and separating apparatus of claim 3, wherein the driving member comprises a first sleeve, the first sleeve is sleeved on the spindle, and the first sleeve is able to rotate synchronously with the spindle and moving along an axial direction of the spindle; and the first sleeve comprises a first end surface and a first protrusion disposed on the first end surface, and the first protrusion comprises a side surface and a top surface, wherein the side surface is connected to the first end surface, and the top surface and the first end face are arranged at an interval;

the driven member comprises a second sleeve, the second sleeve is rotatably sleeved on the spindle, and the second sleeve is fixed along the axial direction of the spindle; and the second sleeve comprises a second end surface and a second protrusion disposed on the second end surface, the second end surface is disposed opposite to the first end surface, and the second protrusion comprises a stop surface and a guide surface, wherein the stop surface is used for fitting with the side surface of the first protrusion, and the guide surface is used for fitting with the top surface of the first protrusion; and when the spindle rotates along the first direction, the spindle drives the first sleeve to rotate, and the side surface abuts against the stop surface, and the first sleeve drives the second sleeve and the paper shifting member to rotate along the first direction; and when the spindle rotates along a second direction opposite to the first direction, the side surface is separated from the stop surface, the top surface is slidably fitted with the guide surface or the second end surface.

5. The sheet medium stacking and separating apparatus of claim 4, wherein the transmission component further comprises a first elastic member, the spindle is provided with a blocking portion, the first elastic member is connected between the blocking portion and the first sleeve, and the first elastic member is configured to cause the first sleeve to have a motion tendency to approach the second sleeve.

6. The sheet medium stacking and separating apparatus of claim 4, wherein the transmission component further comprises a third sleeve and a first elastic member, the third sleeve is fixedly sleeved on the spindle, the third sleeve is inserted into the first sleeve along the axial direction of the spindle, the first elastic member is connected between the first sleeve and the third sleeve, and the first elastic member is configured to cause the first sleeve to have a motion tendency to approach the second sleeve.

7. The sheet medium stacking and separating apparatus of claim 4, wherein the paper shifting member is fixedly connected to an outer peripheral surface of the second sleeve.

8. The sheet medium stacking and separating apparatus of claim 2, wherein the paper shifting mechanism further comprises a spindle, the spindle is supported by the frame, an axis of the spindle is parallel to an axis of the separating roller, the spindle is transmission-connected to the drive member, the paper shifting member is connected to the spindle, when the drive member drives the spindle to rotate along a first direction, the spindle drives the paper shifting member to rotate along the first direction, the gate roller is sleeved on the spindle, and the separating roller and the pickup roller both are transmission-connected to the drive member.

9. The sheet medium stacking and separating apparatus of claim 8, wherein the paper shifting mechanism further comprises a transmission component, the transmission component further comprises a one-way lock component, the one-way lock component is configured to fit with the paper shifting member when the spindle rotates along a second direction opposite to the first direction, so as to prevent the paper shifting member from rotating along the second direction.

10. The sheet medium stacking and separating apparatus of claim 9, wherein the one-way lock component comprises a lock plate and a second elastic member, the lock plate is pivotally connected to the frame, and the lock plate has an unlock position that allows the paper shifting member to rotate along the first direction and a lock position that restricts the paper shifting member to rotate along the second direction; a first end of the lock plate is provided with a lock portion, and a second end of the lock plate is provided with a stopper portion; when the lock plate is located at the unlock position, the stopper portion is separated from the frame, and the lock portion is able to be slidably fitted with and separated from the paper shifting member; when the lock plate is located at the lock position, the stopper portion abuts against the frame, and the lock portion is able to prevent the paper shifting member from rotating along the second direction; and the second elastic member is connected between the frame and the lock plate, and the second elastic member is configured to cause the lock plate to have a tendency to move towards the lock position.

11. A cash recycling and handling apparatus, comprising at least one of a cash input mechanism, a cash output mechanism, a cash box and a temporary storage mechanism, wherein each of the cash input mechanism, the cash output mechanism, the cash box and the temporary storage mechanism are provided with the sheet medium stacking and separating apparatus of claim 1.

12. The cash recycling and handling apparatus of claim 11, wherein the paper shifting mechanism comprises a drive member and a paper shifting member, the drive member is installed on the frame, the paper shifting member is transmission-connected to the drive member, and the drive member is configured to drive the paper shifting member to move so as to drive the sheet medium to move into the storage cavity and away from the paper outlet.

13. The cash recycling and handling apparatus of claim 12, wherein the paper shifting mechanism further comprises a spindle and a transmission component, the spindle is supported by the frame, an axis of the spindle is parallel to an axis of the separating roller, the spindle is transmission-connected to the drive member, and the spindle is able to rotate around the axis of the spindle under action of the drive member; and the transmission component comprises a driving member and a driven member, the driving member is transmission-connected to the spindle, and the driven part is connected to the paper shifting member; and when the spindle drives the driving member to rotate along a first direction, the driven member is transmission-connected to the driving member, and the driven member drives the paper shifting member to rotate along the first direction.

14. The cash recycling and handling apparatus of claim 13, wherein the driving member comprises a first sleeve, the first sleeve is sleeved on the spindle, and the first sleeve is able to rotate synchronously with the spindle and moving along an axial direction of the spindle; and the first sleeve comprises a first end surface and a first protrusion disposed on the first end surface, and the first protrusion comprises a side surface and a top surface, wherein the side surface is connected to the first end surface, and the top surface and the first end face are arranged at an interval;

the driven member comprises a second sleeve, the second sleeve is rotatably sleeved on the spindle, and the second sleeve is fixed along the axial direction of the spindle; and the second sleeve comprises a second end surface and a second protrusion disposed on the second end surface, the second end surface is disposed opposite to the first end surface, and the second protrusion comprises a stop surface and a guide surface, wherein the stop surface is used for fitting with the side surface of the first protrusion, and the guide surface is used for fitting with the top surface of the first protrusion; and when the spindle rotates along the first direction, the spindle drives the first sleeve to rotate, and the side surface abuts against the stop surface, and the first sleeve drives the second sleeve and the paper shifting member to rotate along the first direction; and when the spindle rotates along a second direction opposite to the first direction, the side surface is separated from the stop surface, the top surface is slidably fitted with the guide surface or the second end surface.

15. The cash recycling and handling apparatus of claim 14, wherein the transmission component further comprises a first elastic member, the spindle is provided with a blocking portion, the first elastic member is connected between the blocking portion and the first sleeve, and the first elastic member is configured to cause the first sleeve to have a motion tendency to approach the second sleeve.

16. The cash recycling and handling apparatus of claim 14, wherein the transmission component further comprises a third sleeve and a first elastic member, the third sleeve is fixedly sleeved on the spindle, the third sleeve is inserted into the first sleeve along the axial direction of the spindle, the first elastic member is connected between the first sleeve and the third sleeve, and the first elastic member is configured to cause the first sleeve to have a motion tendency to approach the second sleeve.

17. The cash recycling and handling apparatus of claim 14, wherein the paper shifting member is fixedly connected to an outer peripheral surface of the second sleeve.

18. The cash recycling and handling apparatus of claim 12, wherein the paper shifting mechanism further comprises a spindle, the spindle is supported by the frame, an axis of the spindle is parallel to an axis of the separating roller, the spindle is transmission-connected to the drive member, the paper shifting member is connected to the spindle, when the drive member drives the spindle to rotate along a first direction, the spindle drives the paper shifting member to rotate along the first direction, the gate roller is sleeved on the spindle, and the separating roller and the pickup roller both are transmission-connected to the drive member.

19. The cash recycling and handling apparatus of claim 18, wherein the paper shifting mechanism further comprises a transmission component, the transmission component further comprises a one-way lock component, the one-way lock component is configured to fit with the paper shifting member when the spindle rotates along a second direction opposite to the first direction, so as to prevent the paper shifting member from rotating along the second direction.

20. The cash recycling and handling apparatus of claim 19, wherein the one-way lock component comprises a lock plate and a second elastic member, the lock plate is pivotally connected to the frame, and the lock plate has an unlock position that allows the paper shifting member to rotate along the first direction and a lock position that restricts the paper shifting member to rotate along the second direction; a first end of the lock plate is provided with a lock portion, and a second end of the lock plate is provided with a stopper portion; when the lock plate is located at the unlock position, the stopper portion is separated from the frame, and the lock portion is able to be slidably fitted with and separated from the paper shifting member; when the lock plate is located at the lock position, the stopper portion abuts against the frame, and the lock portion is able to prevent the paper shifting member from rotating along the second direction; and the second elastic member is connected between the frame and the lock plate, and the second elastic member is configured to cause the lock plate to have a tendency to move towards the lock position.

* * * * *